(12) United States Patent
Iizuka et al.

(10) Patent No.: US 9,868,794 B2
(45) Date of Patent: Jan. 16, 2018

(54) METHOD FOR PRODUCING CONJUGATED DIENE RUBBER

(71) Applicant: ZEON CORPORATION, Tokyo (JP)

(72) Inventors: Takashi Iizuka, Tokyo (JP); Tatsuo Sasajima, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 373 days.

(21) Appl. No.: 14/401,966

(22) PCT Filed: Aug. 14, 2013

(86) PCT No.: PCT/JP2013/071934
§ 371 (c)(1),
(2) Date: Nov. 18, 2014

(87) PCT Pub. No.: WO2014/050341
PCT Pub. Date: Mar. 4, 2014

(65) Prior Publication Data
US 2015/0133600 A1 May 14, 2015

(30) Foreign Application Priority Data
Sep. 28, 2012 (JP) .................................. 2012-217032

(51) Int. Cl.
| | |
|---|---|
| *C08C 19/40* | (2006.01) |
| *C08L 25/10* | (2006.01) |
| *C08K 3/34* | (2006.01) |
| *C08L 9/00* | (2006.01) |
| *B60C 1/00* | (2006.01) |
| *C08K 3/36* | (2006.01) |
| *C08F 297/04* | (2006.01) |
| *C08F 8/42* | (2006.01) |

(52) U.S. Cl.
CPC ................ *C08C 19/40* (2013.01); *B60C 1/00* (2013.01); *C08F 8/42* (2013.01); *C08F 297/046* (2013.01); *C08K 3/34* (2013.01); *C08K 3/36* (2013.01); *C08L 9/00* (2013.01); *C08L 25/10* (2013.01)

(58) Field of Classification Search
CPC .... B60C 1/00; C08K 3/00; C08K 3/34; C08K 3/36; C08F 297/046; C08L 25/10; C08L 9/00
See application file for complete search history.

(56) References Cited

U.S. PATENT DOCUMENTS

2013/0260241 A1* 10/2013 Sone ..................... H01M 4/622
429/217

FOREIGN PATENT DOCUMENTS

| JP | 2003531257 A | 10/2003 |
|---|---|---|
| JP | 2004083791 A | 3/2004 |
| JP | 2012149239 A | 8/2012 |
| WO | 2011105362 A1 | 9/2011 |
| WO | WO20111053824 A1 * | 9/2011 |
| WO | 2012043708 A1 | 4/2012 |
| WO | WO2012073678 A1 * | 6/2012 |

OTHER PUBLICATIONS

Sep. 10, 2013 Written Opinion of the International Searching Authority of International Patent Application No. PCT/JP2013/071934.
Sep. 10, 2013 Search Report issued in International Application No. PCT/JP2013/071934.
Jul. 22, 2015 Extended Search Report issued in European Patent Application No. 13842953.5.

* cited by examiner

*Primary Examiner* — Peter D. Mulcahy
(74) *Attorney, Agent, or Firm* — Oliff PLC

(57) ABSTRACT

A method for producing a conjugated diene rubber is provided which includes the steps of: (a) forming a polymer block (A) by using a polymerization initiator in an inert solvent, the polymer block (A) having an active terminal and containing a specific amount of an isoprene monomeric unit and a specific amount of an aromatic vinyl monomeric unit; (b) forming a polymer block (B) having an active terminal and containing a specific amount of a 1,3-butadiene monomeric unit and, as needed, a specific amount of an aromatic vinyl monomeric unit, thereby obtaining a conjugated diene polymer chain having an active terminal and having the polymer block (A) and a polymer block (B); (c) bringing a specific amount of a predetermined denaturant into reaction with the active terminal of the conjugated diene polymer chain having the active terminal.

13 Claims, No Drawings

METHOD FOR PRODUCING CONJUGATED DIENE RUBBER

TECHNICAL FIELD

The present invention relates to methods for producing conjugated diene rubbers and, more particularly, to a method for producing a conjugated diene rubber that is suitably used for providing a tire that is superior in low-heat-generating properties, wet-grip properties, and strength.

BACKGROUND ART

In recent years, there has been a strong demand for fuel-efficient automotive tires out of concern for the environment and resources and there has been a further demand for superior wet-grip properties and strength out of concern for safety. A tire made from a rubber composition containing silica as a filler is better in low-heat-generating properties and can therefore make a more fuel-efficient tire than a tire made from a rubber composition containing conventionally-used carbon black.

As a conjugated diene rubber that is used for providing such a fuel-efficient tire, Patent Literature 1 discloses a conjugated diene rubber that is obtained by causing a particular halogenated tin compound to react with a conjugated diene polymer chain having an isoprene block at one end thereof and an active terminal at the other end. Further, Patent Literature 2 discloses a conjugated diene rubber containing a predetermined amount or more of a structure formed by binding of three or more conjugated diene polymer chains produced by causing a particular denaturant to react with a conjugated diene polymer chain having an isoprene block at one end thereof and an active terminal at the other end.

CITATION LIST

Patent Literature 1
Japanese Translation of PCT International Publication, Tokuhyo, No. 2003-531257 A
Patent Literature 2
International Publication No. 2011/105362

SUMMARY OF INVENTION

Technical Problem

However, in view of the recently increasing demand for higher performance of automotive tires, it is desired that tires to be newly developed in the future be made from a conjugated diene rubber that is used to make tires that are superior in low-heat-generating properties, wet-grip properties, and strength to those made from the conjugated diene rubber specifically described in these patent literatures.

The present invention has been made in view of the foregoing problems, and it is an object of the present invention to provide a method for producing a conjugated diene rubber that is suitably used for providing a tire that is superior in low-heat-generating properties, wet-grip properties, and strength.

Solution to Problem

The inventors of the present invention diligently studied to attain the foregoing object. As a result, the inventors of the present invention found that the foregoing object can be attained by a method for producing a conjugated diene rubber, including the steps of: (a) forming a polymer block (A) by using a polymerization initiator in an inert solvent, the polymer block (A) having an active terminal and containing a specific amount of an isoprene monomeric unit and a specific amount of an aromatic vinyl monomeric unit; (b) forming a polymer block (B) having an active terminal and containing a specific amount of a 1,3-butadiene monomeric unit and, as needed, a specific amount of an aromatic vinyl monomeric unit, thereby obtaining a conjugated diene polymer chain having an active terminal and having the polymer block (A) and a polymer block (B); (c) then obtaining conjugated diene rubber by bringing a specific amount of a predetermined denaturant into reaction with the active terminal of the conjugated diene polymer chain having the active terminal.

That is, the present invention provides a method for producing a conjugated diene rubber, including the steps of: (a) forming a polymer block (A) by polymerizing a monomeric mixture with a polymerization initiator in an inert solvent, the polymer block (A) having an active terminal and containing 80 to 95% by weight of an isoprene monomeric unit and 5 to 20% by weight of an aromatic vinyl monomeric unit, the monomeric mixture containing isoprene and an aromatic vinyl monomer; (b) obtaining a conjugated diene polymer chain having an active terminal and having the polymer block (A) and a polymer block (B), the polymer block (B) being formed continuously with the polymer block (A) through the continuation of a polymerization reaction caused by mixing of the polymer block (A) having the active terminal and either 1,3-butadiene or a monomeric mixture containing 1,3-butadiene and an aromatic vinyl monomer, the polymer block (B) having an active terminal and containing 50 to 100% by weight of a 1,3-butadiene monomeric unit and 0 to 50% by weight of an aromatic vinyl monomeric unit; and (c) bringing a denaturant into reaction with the active terminal of the conjugated diene polymer chain having the active terminal, the denaturant having three or more groups per molecule, the three or more groups being each at least either group selected from among an epoxy group and an alkoxy group, the reaction taking place insofar as the total molar ratio of an epoxy group(s) and/or an alkoxy group(s) in the denaturant with respect to the polymerization initiator used in the polymerization ranges from 0.1 to 1.

Advantageous Effects of Invention

The present invention makes it possible to provide a method for producing a conjugated diene rubber that is suitably used for providing a tire that is superior in low-heat-generating properties, wet-grip properties, and strength. Furthermore, the present invention also makes it possible to provide a conjugated diene rubber obtained by the production method, a rubber composition containing the conjugated diene rubber, a rubber cross-linked product formed by cross-linking the rubber composition, and a tire made from the rubber cross-linked product.

DESCRIPTION OF EMBODIMENTS

That is, the present invention provides a method for producing a conjugated diene rubber, including the steps of: (a) forming a polymer block (A) by polymerizing a monomeric mixture with a polymerization initiator in an inert solvent, the polymer block (A) having an active terminal and containing 80 to 95% by weight of an isoprene monomeric unit and 5 to 20% by weight of an aromatic vinyl monomeric unit, the monomeric mixture containing isoprene and an aromatic vinyl monomer; (b) obtaining a conjugated diene polymer chain having an active terminal and having the polymer block (A) and a polymer block (B), the polymer block (B) being formed continuously with the polymer block (A) through the continuation of a polymerization reaction caused by mixing of the polymer block (A) having the active terminal and either 1,3-butadiene or a monomeric mixture containing 1,3-butadiene and an aromatic vinyl monomer, the polymer block (B) having an active terminal and containing 50 to 100% by weight of a 1,3-butadiene monomeric unit and 0 to 50% by weight of an aromatic vinyl monomeric unit; and (c) bringing a denaturant into reaction with the active terminal of the conjugated diene polymer chain having the active terminal, the denaturant having three or more groups per molecule, the three or more groups being each at least either group selected from among an epoxy group and an alkoxy group, the reaction taking place insofar as the total molar ratio of an epoxy group(s) and/or an alkoxy group(s) in the denaturant with respect to the polymerization initiator used in the polymerization ranges from 0.1 to 1.

<Conjugated Diene Polymer Chain Having an Active Terminal>

A method for producing a conjugated diene rubber of the present invention includes executing the step (a) of first forming a polymer block (A) by polymerizing a monomeric mixture with a polymerization initiator in an inert solvent, the polymer block (A) having an active terminal and containing 80 to 95% by weight of an isoprene monomeric unit and 5 to 20% by weight of an aromatic vinyl monomeric unit, the monomeric mixture containing isoprene and an aromatic vinyl monomer and the step (b) of then obtaining a conjugated diene polymer chain having an active terminal and having the polymer block (A) and a polymer block (B), the polymer block (B) being formed continuously with the polymer block (A) through the continuation of a polymerization reaction caused by mixing of the polymer block (A) having the active terminal and either 1,3-butadiene or a monomeric mixture containing 1,3-butadiene and an aromatic vinyl monomer, the polymer block (B) having an active terminal and containing 50 to 100% by weight of a 1,3-butadiene monomeric unit and 0 to 50% by weight of an aromatic vinyl monomeric unit.

[Polymer Block (A)]

The polymer block (A) in the conjugated diene polymer chain that is used in the present invention is not particularly limited, provided the polymer block (A) contains 80 to 95% by weight of an isoprene monomeric unit and 5 to 20% by weight of an aromatic vinyl monomeric unit. It is preferable that the polymer block (A) contain 85 to 95% by weight of an isoprene monomeric unit and 5 to 15% by weight of an aromatic vinyl monomeric unit. It is more preferable that the polymer block (A) contain 89 to 95% by weight of an isoprene monomeric unit and 5 to 11% by weight of an aromatic vinyl monomeric unit. When the polymer block (A) contains an isoprene monomeric unit and an aromatic vinyl monomeric unit in proportions falling within the aforementioned range, the conjugated diene rubber exhibits a good affinity for silica combined, if any, with the conjugated diene rubber, and a tire made from the resulting rubber composition is superior in low-heat-generating properties, wet-grip properties, and strength.

An example of a monomer that is used for constituting the aromatic vinyl monomeric unit contained in the polymer block (A) is an aromatic vinyl monomer such as styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, vinyl naphthalene, dimethylaminomethyl styrene, and dimethylaminoethyl styrene. Among them, styrene is preferable. One of these aromatic vinyl monomers may be used alone, or two or more of them may be used in combination.

It is preferable that the polymer block (A) be composed solely of the isoprene monomeric unit and the aromatic vinyl monomeric unit. However, the polymer block (A) may further contain (an)other monomeric unit(s) as desired in addition to the isoprene monomeric unit and the aromatic vinyl monomeric unit, provided the essential property of the present invention is not impaired. Examples of (an)other monomer(s) that is/are used for constituting the (an)other monomeric unit(s) include: conjugated diene monomers other than isoprene such as 1,3-butadiene, 2,3-dimethyl-1,3-butadiene, 2-chloro-1,3-butadiene, 1,3-pentadiene, and 1,3-hexadiene; α,β-unsaturated nitrile such as acrylonitrile and methacrylonitrile; unsaturated carboxylic acid or acid anhydride such as acrylic acid, methacrylic acid, and maleic acid anhydride; unsaturated carboxylic ester such as methyl methacrylate, ethyl acrylate, and butyl acrylate; unconjugated diene such as 1,5-hexadiene, 1,6-heptadiene, 1,7-octadiene, dichloropentadiene, and 5-ethylidene-2-norbornene; and the like. Among them, 1,3-butadiene is preferable. One of these other monomers may be used alone, or two or more of them may be used in combination. The (an)other monomeric unit(s) is/are contained in a proportion of 15% by weight or less, preferably 10% by weight or less, more preferably 6% by weight or less, in the polymer block (A).

The polymer block (A) in the conjugated diene polymer chain that is used in the present invention is formed by polymerizing a monomeric mixture with a polymerization initiator in an inert solvent, the monomeric mixture containing isoprene, an aromatic vinyl monomer, and an(other) monomer(s) added as needed. The polymer block (A) thus formed has an active terminal.

The inert solvent in which the monomeric mixture containing isoprene and an aromatic vinyl monomer is polymerized to form the polymer block (A) is not particularly limited, provided it is one that is normally used in solution polymerization and that does not inhibit a polymerization reaction. Specific examples thereof include: chain aliphatic hydrocarbons such as butane, pentane, hexane, heptane, and 2-butene; aliphatic hydrocarbons such as cyclopentane, cyclohexane, and cyclohexene; aromatic hydrocarbons such as benzene, toluene, and xylene; and the like. The amount of the inert solvent that is used is for example 1 to 80% by weight, preferably 10 to 50% by weight, in terms of monomer concentration.

The polymerization initiator with which the polymer block (A) is formed is not particularly limited, provided it is one that causes a monomeric mixture containing isoprene and an aromatic vinyl monomer to be polymerized to give a polymer chain having an active terminal. As a specific example thereof, a polymerization initiator containing as its major catalyst an organic alkali metal compound and an organic alkali earth metal compound, as well as a lanthanum series metal compound or the like is for example preferably used. Examples of the organic alkali metal compound include: organic monolithium compounds such as n-butyl lithium, sec-butyl lithium, t-butyl lithium, hexyl lithium, phenyl lithium, and stilbene lithium; organic polyvalent lithium such as dilithio methane, 1,4-dilithio butane, 1,4- dilithio-2-ethylcyclohexane, 1,3,5-trilithio benzene, and 1,3,5-tris(lithiomethyl)benzene; organic sodium compounds such as sodium naphthalene; organic potassium compounds such as potassium naphthalene; and the like. Further, examples of the organic alkali earth metal compound include di-n-butyl magnesium, di-n-hexyl magnesium, diethoxy calcium, calcium distearate, di-t-butoxy strontium, diethoxy barium, diisopropoxy barium, diethylmercapto barium, di-t-butoxy barium, diphenoxy barium, diethylamino barium, barium distearate, diketyl barium, and the like. An example of a polymerization initiator containing a lanthanum series metal compound as its major catalyst is a polymerization catalyst composed of (a) a salt of a lanthanum series metal as its major catalyst and (b) an alkylaluminium compound, an organic aluminum hydride compound, an organic aluminum halide compound, or the like as its promoter. The salt of the lanthanum series metal is composed of a lanthanum series metal such as lanthanum, cerium, praseodymium, neodymium, samarium, gadolinium, or the like and of carboxylic acid, phosphorus-containing organic acid, or the like. Among theses polymerization initiators, it is preferable that an organic monolithium compound be used, and it is more preferable that n-butyl lithium be used. It should be noted that an organic alkali metal compound may be brought into reaction in advance with a secondary amine such as dibutylamine, dihexylamine, dibenzylamine, pyrrolidine, hexamethyleneimine, or heptamethyleneimine to be used as an organic alkali metal amide compound. One of these polymerization initiators may be used alone, or two or more of them may be used in combination.

The amount of the polymerization initiator that is used may be determined according to the intended molecular weight, but ranges preferably from 4 to 250 mmol, more preferably from 6 to 200 mmol, especially preferably from 10 to 70 mmol, per 100 g of the monomeric mixture.

The polymeric mixture is polymerized at a polymerization temperature, for example, in the range of −80 to +150° C., preferably 0 to 100° C., more preferably 20 to 90° C. The polymeric mixture may be polymerized in any mode of polymerization such as batch polymerization or continuous polymerization. Further, as a mode of binding, any of various modes of binding, such as block binding, tapered binding, and random binding, may be used.

It is preferable that a polar compound be added to the inert solvent in polymerization to adjust the amount of a vinyl bond that is contained in the isoprene monomeric unit in the polymer block (A). Examples of the polar compound include: ether compounds such as dibutyl ether, tetrahydrofuran, and 2,2-di(tetrahydrofuryl)propane; tertiary amines such as tetramethylethylene diamine; alkali metal alkoxide; phosphine compounds; and the like. Among them, ether compounds and tertiary amines are preferable. Among them, those ether compounds and tertiary amines which can form a chelate structure with the metal of the polymerization initiator are more preferable, and 2,2-di(tetrahydrofuryl)propane and tetramethylethylene diamine are especially preferable. The amount of a polar compound that is used may be determined according to the intended vinyl bond content, and is preferably 0.01 to 30 mol, more preferably 0.05 to 10 mol, with respect to 1 mol of the polymerization initiator. When the amount of a polar compound that is used falls within this range, the adjustment of the amount of a vinyl bond that is contained in the isoprene monomeric unit is easy and a problem due to deactivation of the polymerization initiator hardly occurs. Causing the amount of a polar compound that is used to increase within this range can increase the amount of a vinyl bond that is contained in the isoprene monomeric unit.

The amount of a vinyl bond that is contained in the isoprene monomeric unit in the polymer block (A) is preferably 5 to 90% by weight, more preferably 5 to 80% by weight. When the amount of a vinyl bond that is contained in the isoprene monomeric unit falls within this range, the resulting tire will be superior in low-heat-generating properties and wet-grip properties. As used herein, the term "amount of a vinyl bond that is contained in the isoprene monomeric unit" refers to the proportion of the total amount of an isoprene monomeric unit having a 1,2-structure and an isoprene monomeric unit having a 3,4-structure to the isoprene monomeric unit.

The polymer block (A) has a weight-average molecular weight (Mw) of preferably 500 to 15,000, more preferably 1,000 to 12,000, especially preferably 1,500 to 10,000, as a value in terms of polystyrene as measured by gel permeation chromatography. When the polymer block (A) has a weight-average molecular weight in this range, the resulting tire will be superior in low-heat-generating properties, wet-grip properties, and strength.

A molecular weight distribution represented by the ratio of the weight-average molecular weight (Mw) of the polymer block (A) to the number average molecular weight (Mn) is preferably 1.0 to 1.5, more preferably 1.0 to 1.3. When the value of the molecular weight distribution (Mw/Mn) of the polymer block (A) falls within this range, it becomes easier to produce a conjugated diene rubber.

[Polymer Block (B)]

The polymer block (B) in the conjugated diene polymer chain that is used in the present invention is not particularly limited, provided the polymer block (B) contains 50 to 100% by weight of a 1,3-butadiene monomeric unit and 0 to 50% by weight of an aromatic vinyl monomeric unit. It is preferable that the polymer block (B) contain 55 to 95% by weight of a 1,3-butadiene monomeric unit and 5 to 45% by weight of an aromatic vinyl monomeric unit. It is more preferable that the polymer block (B) contain 55 to 90% by weight of a 1,3-butadiene monomeric unit and 10 to 45% by weight of an aromatic vinyl monomeric unit. When the polymer block (B) contains a 1,3-butadiene monomeric unit and an aromatic vinyl monomeric unit in proportions falling within the aforementioned range, it becomes easier to produce a conjugated diene rubber.

As a monomer that is used for constituting the aromatic vinyl monomeric unit contained in the polymer block (B), any of the aromatic vinyl monomers exemplified above in the "Polymer Block (A)" section can be used in the same manner. Among them, styrene is preferable.

It is preferable that the polymer block (B) be composed solely of the 1,3-butadiene monomeric unit or of the 1,3-butadiene monomeric unit and the aromatic vinyl monomeric unit. However, the polymer block (B) may further contain (an)other monomeric unit(s) as desired in addition to the 1,3-butadiene monomeric unit and the aromatic vinyl monomeric unit, provided the essential property of the present invention is not impaired. As (an)other monomer(s) that is/are used for constituting the (an)other monomeric unit(s), any of the compounds exemplified above in the "Polymer Block (A)" section except for 1,3-butadiene can be used in the same manner. Further, in the polymer block (B), isoprene can be used as another monomer. The (an)other monomeric unit(s) is/are contained in a proportion of 50% by weight or less, preferably 40% by weight or less, more preferably 35% by weight or less, in the polymer block (B).

The polymer block (B) in the conjugated diene polymer chain that is used in the present invention is formed continuously with the polymer block (A) through the continuation of a polymerization reaction caused by mixing of the polymer block (A) having the active terminal and either 1,3-butadiene or a monomeric mixture containing 1,3-butadiene and an aromatic vinyl monomer. The polymer block (B) thus formed has an active terminal.

The inert solvent with which the polymer block (B) is formed is the same as the inert solvent with which the aforementioned polymer block (A) is prepared.

The amount of the polymer block (A) having the active terminal that is used in the formation of the polymer block (B) may be determined according to the intended molecular weight, but ranges for example from 0.1 to 5 mmol, more preferably from 0.15 to 2 mmol, especially preferably from 0.2 to 1.50 mmol, per 100 g of either 1,3-butadiene or the monomeric mixture containing 1,3-butadiene and an aromatic vinyl monomer.

A method for mixing together the polymer block (A) and either 1,3-butadiene or the monomeric mixture containing 1,3-butadiene and an aromatic vinyl monomer is not particularly limited. The polymer block (A) having the active terminal may be added into a solution of either 1,3-butadiene or the monomeric mixture containing 1,3-butadiene and an aromatic vinyl monomer, or either 1,3-butadiene or the monomeric mixture containing 1,3-butadiene and an aromatic vinyl monomer may be added into a solution of the polymer block (A) having the active terminal. From a point of view of control of polymerization, it is preferable that the polymer block (A) having the active terminal be added into a solution of either 1,3-butadiene or the monomeric mixture containing 1,3-butadiene and an aromatic vinyl monomer.

Either 1,3-butadiene or the monomeric mixture containing 1,3-butadiene and an aromatic vinyl monomer is polymerized at a polymerization temperature, for example, in the range of −80 to +150° C., preferably 0 to 100° C., more preferably 20 to 90° C. Either 1,3-butadiene or the monomeric mixture containing 1,3-butadiene and an aromatic vinyl monomer may be polymerized in any mode of polymerization such as batch polymerization or continuous polymerization. For the polymer block (B) to be a copolymer chain, batch polymerization is preferable in terms of ease of control of randomness of binding.

A mode of binding of each monomer for the polymer block (B) to be a copolymer chain can be any of various modes of binding, such as block binding, tapered binding, and random binding, may be used. Among them, random binding is preferable. A tire obtained by random binding is superior in low-heat-generating properties. When the mode of binding of 1,3-butadiene and an aromatic vinyl monomer is random, it is preferable that either 1,3-butadiene or 1,3-butadiene and an aromatic vinyl monomer be supplied into the polymerization system for polymerization so that the ratio of the aromatic vinyl monomer to the total amount of 1,3-butadiene and the aromatic vinyl monomer in the polymerization system does not become too high.

As at the time of adjustment of the amount of a vinyl bond that is contained in the isoprene monomeric unit in the polymer block (A), it is preferable that a polar compound be added to the inert solvent in polymerization to adjust the amount of a vinyl bond that is contained in the 1,3-butadiene monomeric unit in the polymer block (B). However, in a case where a sufficient amount of a polar compound has been added to the inert solvent at the time of preparation of the polymer block (A) to adjust the amount of a vinyl bond that is contained in the 1,3-butadiene monomeric unit in the polymer block (B), it is not necessary to newly add a polar compound. Specific examples of a polar compound that is used for adjusting the vinyl bond content are the same as those of the polar compound used in the preparation of the aforementioned polymer block (A). The amount of a polar compound that is used may be determined according to the intended vinyl bond content, and is preferably 0.01 to 100 mol, more preferably 0.1 to 30 mol, with respect to 1 mol of the polymerization initiator. When the amount of a polar compound that is used falls within this range, the adjustment of the amount of a vinyl bond that is contained in the 1,3-butadiene monomeric unit is easy and a problem due to deactivation of the polymerization initiator hardly occurs.

The amount of a vinyl bond that is contained in the 1,3-butadiene monomeric unit in the polymer block (B) is preferably 10 to 90% by weight, more preferably 20 to 80% by weight, especially preferably 25 to 70% by weight. When the amount of a vinyl bond that is contained in the 1,3-butadiene monomeric unit in the polymer block (B) falls within this range, the resulting tire will be superior in low-heat-generating properties.

In this way, a conjugated diene polymer chain having an active terminal and having the polymer block (A) and a polymer block (B) can be obtained. From a point of view of productivity, it is preferable that the conjugated diene polymer chain having an active terminal that is used in the present invention be constituted by polymer block (A)-polymer block (B) and that the terminal of the polymer block (B) is an active terminal; however, the conjugated diene polymer chain may have a plurality of polymer blocks (A) and may have another polymer block. Examples of the conjugated diene polymer chain having an active terminal include polymer block (A)-polymer block (B)-polymer block (A), polymer block (A)-polymer block (B)-polymer block composed solely of isoprene, and the like. When a block composed solely of isoprene is formed on the side of the active terminal of the conjugated diene polymer chain, the amount of isoprene that is used is preferably 10 to 100 mol, more preferably 15 to 70 mol, especially preferably 20 to 35 mol, with respect to 1 mol of the polymerization initiator used in the first polymerization reaction.

When the ratio by weight of the polymer block (A) to the polymer block (B) of the conjugated diene polymer chain having an active terminal that is used in the present invention (when the conjugated diene polymer chain has a plurality of polymer blocks (A) and a plurality of polymer blocks (B), the ratio by weight being based on the total weight of the polymer blocks (A) and the total weight of the polymer blocks (B)) is preferably 0.001 to 0.1, more preferably 0.003 to 0.07, especially preferably 0.005 to 0.05, as (Weight of Polymer Block(s) (A)/Weight of Polymer Block(s) (B)). When the ratio by weight of the polymer block(s) (A) to the polymer block(s) (B) falls within this range, the resulting tire will be satisfactory in balance between strength and low-heat-generating properties.

The conjugated diene polymer chain having an active terminal that is used in the present invention has a weight-average molecular weight (Mw) of preferably 100,000 to 1,000,000, more preferably 150,000 to 700,000, especially preferably 150,000 to 500,000, as a value in terms of polystyrene as measured by gel permeation chromatography. When the conjugated diene polymer chain having an active terminal has a weight-average molecular weight in this range, the resulting tire will be satisfactory in balance between strength and low-heat-generating properties.

A molecular weight distribution represented by the ratio of the weight-average molecular weight (Mw) of the conjugated diene polymer chain having an active terminal to the number average molecular weight (Mn) is preferably 1.0 to 3.0, more preferably 1.0 to 2.5, especially preferably 1.0 to 2.2. When the value of the molecular weight distribution (Mw/Mn) of the conjugated diene polymer chain having an active terminal falls within this range, it becomes easier to produce a conjugated diene rubber.

The conjugated diene polymer chain having an active terminal contains (a) a total monomeric unit of an isoprene monomeric unit and a 1,3-butadiene monomeric unit and (b) an aromatic vinyl monomeric unit in proportions of preferably 50 to 99.995% by weight and 0.005 to 50% by weight respectively, more preferably 55 to 95% by weight and 5 to 45% by weight respectively, especially preferably 55 to 90% by weight and 10 to 45% by weight respectively. Further, the amount of a vinyl bond that is contained in the isoprene monomeric unit and the 1,3-butadiene monomeric unit in the conjugated diene polymer chain having an active terminal is the same as the amount of a vinyl bond that is contained in the 1,3-butadiene monomeric unit in the polymer block (B).

<Conjugated Diene Rubber>

The method for producing a conjugated diene rubber of the present invention includes obtaining a conjugated diene rubber by executing the step (c) of then bringing a denaturant into reaction with the active terminal of the conjugated diene polymer chain having the active terminal, the denaturant having three or more groups per molecule, the three or more groups being each at least either group selected from among an epoxy group and an alkoxy group, the reaction taking place insofar as the total molar ratio of an epoxy group(s) and/or an alkoxy group(s) in the denaturant with respect to the polymerization initiator used in the polymerization ranges from 0.1 to 1.

[Denaturant]

As used herein, the "denaturant" is one that has, in a molecule, a functional group that reacts with the active terminal of the conjugated diene polymer chain, and in the present invention, this functional group is at least either group selected from among an epoxy group and an alkoxy group. In the present invention, the number of these functional groups is three or more per molecule. Use of a denaturant having three or more groups per molecule, the three or more groups being each at least either group selected from among an epoxy group and an alkoxy group, makes it possible to denature the conjugated diene polymer chain highly efficiently, so that a conjugated diene rubber obtained by the production method of the present invention exhibits a better affinity for silica. As a result, the resulting tire is superior in low-heat-generating properties. As used herein, the phrase "having three or more groups per molecule, the three or more groups being each at least either group selected from among an epoxy group and an alkoxy group" is intended to encompass a case of having three or more epoxy groups per molecule, a case of having three or more alkoxy groups per molecule, a case of having one epoxy group and two or more alkoxy groups per molecule, a case of having two epoxy groups and one or more alkoxy groups per molecule, and a case of having three or more epoxy groups and one or more alkoxy groups per molecule.

The denaturant that is used in the present invention is not particularly limited, provided it has three or more groups per molecule, the three or more groups being each at least either group selected from among an epoxy group and an alkoxy group. Examples of the denaturant include: a polyorganosiloxane represented by general formula (I) below; alkoxy silanes such as tetramethoxysilane, tetraethoxysilane, N,N-bis(trimethylsilyl)-3-aminopropyl trimethoxysilane, N,N-bis(trimethylsilyl)-3-aminopropyl triethoxysilane, N,N-bis(trimethylsilyl)aminoethyl trimethoxysilane, N,N-bis(trimethylsilyl)aminoethyl triethoxysilane, and bis(trimethoxysilyl)ethane; and the like. Among them, polyorganosiloxane represented by general formula (I) is preferable. Use of the polyorganosiloxane represented by general formula (I) below causes the resulting tire to be far superior in low-heat-generating properties, wet-grip properties, and strength.

[Chem. 1]

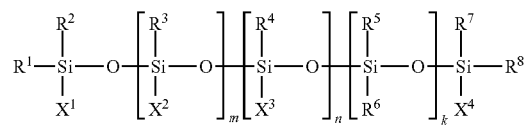

wherein $R^1$ to $R^8$ are each a C1-6 alkyl group or a C6-12 aryl group and may be identical to or different from one another; $X^1$ and $X^4$ are each any group selected from the group consisting of a C1-6 alkyl group, a C6-12 aryl group, a C1-5 alkoxy group, and a C4-12 group containing an epoxy group and may be identical to or different from one another; $X^2$ is a C1-5 alkoxy group or a C4-12 group containing an epoxy group, and a plurality of occurrences of $X^2$ may be identical to or different from one another; $X^3$ is a group containing 2 to 20 alkyleneglycol repeating units, and when there are a plurality of occurrences of $X^3$, they may be identical to or different from one another; m is an integer of 3 to 200; n is an integer of 0 to 200; and k is an integer of 0 to 200.

In the polyorganosiloxane represented by general formula (I), examples of a C1-6 alkyl group that can constitute $R^1$ to $R^8$, $X^1$, and $X^4$ include a methyl group, an ethyl group, an n-propyl group, an isopropyl group, a butyl group, a pentyl group, a hexyl group, a cyclohexyl group, and the like. Examples of a C6-12 aryl group include a phenyl group, a methylphenyl group, and the like. Among them, a methyl group and an ethyl group are preferable from a point of view of ease of the production of the polyorganosiloxane per se.

In the polyorganosiloxane represented by general formula (I), examples of a C1-5 alkoxy group that can constitute $X^1$, $X^2$, and $X^4$ include a methoxy group, an ethoxy group, a propoxy group, an isopropoxy group, a butoxy group, and the like. Among them, a methoxy group and an ethoxy group are preferable from a point of view of reactivity with the active terminal of the conjugated diene polymer chain.

Further, in the polyorganosiloxane represented by general formula (I), an example of a C4-12 group containing an epoxy group that can constitute $X^1$, $X^2$, and $X^4$ is a group represented by general formula (II):

wherein $Z^1$ is a C1-10 alkylene group or alkylarylene group; $Z^2$ is a methylene group, a sulfur atom, or an oxygen atom; and E is a C2-10 hydrocarbon group having an epoxy group.

In the group represented by general formula (II), it is preferable that $Z^2$ be an oxygen atom, more preferable that $Z^2$ be an oxygen atom and E be a glycidyl group, and especially preferable that $Z^1$ be a C1-3 alkylene group, $Z^2$ be an oxygen atom and E be a glycidyl group.

In the polyorganosiloxane represented by general formula (I), as $X^1$ and $X^4$, among those named above, a C4-12 group containing an epoxy group or a C1-6 alkyl group is preferable. Further, as $X^2$, among those named above, a C4-12 group containing an epoxy group is preferable. Furthermore, it is preferable that $X^1$ and $X^4$ be a C1-6 alkyl group and $X^2$ be a C4-12 group containing an epoxy group.

In the polyorganosiloxane represented by general formula (I), as $X^3$, i.e. as a group containing 2 to 20 alkyleneglycol repeating units, a group represented by general formula (III) below is preferable.

[Chem. 2]

wherein t is an integer of 2 to 20; P is a C2-10 alkylene group or alkylarylene group; R is a hydrogen atom or a methyl group; and Q is a C1-10 alkoxy group or aryloxy group. Among them, it is preferable that t be an integer of 2 to 8; P be a C3 alkylene group; R be a hydrogen atom; and Q be a methoxy group.

In the polyorganosiloxane represented by general formula (I), m is an integer of 3 to 200, preferably 20 to 150, more preferably 30 to 120. When m is 3 or greater, the conjugated diene rubber obtained by the production method of the present invention exhibits a better affinity for silica. As a result, the resulting tire is superior in low-heat-generating properties. Further, when m is 200 or less, it becomes easier to produce the polyorganosiloxane per se and, as its viscosity is not too high, it becomes easier to handle it.

Further, in the polyorganosiloxane represented by general formula (I), n is an integer of 0 to 200, preferably 0 to 150, more preferably 0 to 120, and k is an integer of 0 to 200, preferably 0 to 150, more preferably 0 to 130. The sum of m, n, and k is preferably 3 to 400, more preferably 20 to 300, especially preferably 30 to 250. When the sum of m, n, and k falls within this range, it becomes easier to produce the polyorganosiloxane per se and, as its viscosity is not too high, it becomes easier to handle it.

It should be noted that in the polyorganosiloxane represented by general formula (I), when the epoxy group(s) in the polyorganosiloxane react(s) with the active terminal of the conjugated diene polymer chain, at least part of the epoxy group(s) open(s) its/their rings(s), whereby a bond between the carbon atom(s) in the ring-opened part(s) of the epoxy group(s) and the active terminal of the conjugated diene polymer chain is believed to be formed. Further, when the alkoxy group(s) in the polyorganosiloxane react(s) with the active terminal of the conjugated diene polymer chain, at least part of the alkoxy group(s) get(s) desorbed, whereby a bond between the silicon atom(s) in the polyorganosiloxane to which the desorbed alkoxy group(s) was/were bound and the active terminal of the conjugated diene polymer chain is believed to be formed.

The amount of the denaturant that is used in such an amount that the total molar ratio of an epoxy group(s) and/or an alkoxy group(s) in the denaturant with respect to 1 mol of the polymerization initiator used in the polymerization ranges from 0.1 to 1, preferably from 0.2 to 0.9, more preferably 0.3 to 0.8. When the amount of the denaturant falls within this range, the resulting tire will be superior in low-heat-generating properties, wet-grip properties, and strength. One of these denaturants may be used alone, or two or more of them may be used in combination.

In the method for producing a conjugated diene rubber of the present invention, not only is the conjugated diene polymer chain having the active terminal denaturized by the aforementioned denaturant, but also some conjugated diene polymer chains having active terminals may be inactivated by adding a polymerization terminator, a polymerization terminal denaturant other than the aforementioned denaturant, and a coupling agent into the polymerization system, provided the effects of the present invention are not inhibited. That is, in the conjugated diene rubber of the present invention, some conjugated diene polymer chains having active terminals may be inactivated by a polymerization terminator, a polymerization terminal denaturant other than the aforementioned denaturant, and a coupling agent, provided the effects of the present invention are not inhibited.

Examples of the polymerization terminal denaturant and the coupling agent that are used here include: N-substituted cyclic amides such as N-methyl-2-pyrrolidone, N-vinyl-2-pyrrolidone, N-phenyl-2-pyrrolidone, and N-methyl-ϵ-caprolactam; N-substituted cyclic ureas such as 1,3-dimethylethylene urea and 1,3-diethyl-2-imidazolidinone, N-substituted amino ketones such as 4,4'-bis(dimethylamino)benzophenone and 4,4'-bis(diethylamino)benzophenone; aromatic isocyanates such as diphenylmethane diisocyanate and 2,4-tolylenediisocyanate; N-di-substituted aminoalkyl methacryl amides such as N,N-dimethylaminopropyl methacryl amide; N-substituted amino aldehydes such as 4-N,N-dimethylamino benzaldehyde; N-substituted carbodiimides such as dicyclohexyl carbodiimide; Schiff's bases such as N-ethyl ethylidene imine and N-methyl benzylidene imine; pyridyl group-containing vinyl compounds such as 4-vinylpyridine; tin tetrachloride; halogenated silicon compounds such as silicon tetrachloride, hexachlorodisilane, bis(trichlororsilyl)methane, 1,2-bis(trichlororsilyl)ethane, 1,3-bis(trichlororsilyl)propane, 1,4-bis(trichlororsilyl)butane, 1,5-bis(trichlororsilyl)pentane, and 1,6-bis(trichlororsilyl)hexane; and the like. A tire made from a hyper branched conjugated diene rubber obtained through concomitant use as a coupling agent of a halogenated silicon compound having five or more silicon-halogen atomic bonds per molecule is superior in controllability. One of these polymerization terminal denaturants and these coupling agents may be used alone, or two or more of them may be used in combination.

When the aforementioned denaturant, the aforementioned coupling agent, and/or the like is/are brought into reaction with the active terminal of the conjugated diene polymer chain, it is preferable that the denaturant and/or the like be added to a solution containing the conjugated diene polymer chain having the active terminal, and from a point of view of satisfactory control of the reaction, it is more preferable that the denaturant and/or the like be dissolved in the inert solvent and then added into the polymerization system. It is preferable that the concentration of the solution range from 1 to 50% by weight.

The timing of addition of the denaturant and/or the like is not particularly limited. However, it is preferable that the denaturant and/or the like be added to the solution containing the conjugated diene polymer chain having the active terminal in a state where the polymerization reaction in the conjugated diene polymer chain having the active terminal has not completed and where the solution also contains a monomer, more specifically in a state where the solution contains not less than 100 ppm of a monomer, more preferably 300 to 50,000 ppm of a monomer. Addition of the denaturant and/or the like in this manner makes it possible to satisfactorily control the reaction by controlling a side reaction between the conjugated diene polymer chain having the active terminal and an impurity contained in the polymerization system.

The conditions under which the aforementioned denaturant and/or the like is/are brought into reaction with the active terminal of the conjugated diene polymer chain are as follows: at a temperature in the range of 0 to 100° C., preferably 30 to 90° C.; and for a reaction time in the range of 1 to 120 minutes each, preferably 2 to 60 minutes each.

It is preferable that after the aforementioned denaturant and the coupling agent and/or the like added as desired have been brought into reaction with the active terminal of the conjugated diene polymer chain, an unreacted active terminal be deactivated by adding a polymer terminator such as alcohol such as methanol and isopropanol or water.

After the active terminal of the conjugated diene polymer chain have been deactivated, an antioxidant (such as a phenolic stabilizer, a phosphoric stabilizer, or a sulfuric stabilizer), a crumbing agent, a scale preventive, and/or the like is/are added to the polymerization solution, and after that the polymerization solvent is separated from the polymerization solution by direct drying, steam stripping, or the like, whereby the conjugated diene rubber obtained by the production method of the present invention is collected. Alternatively, the conjugated diene rubber may be collected as oil extended rubber by mixing extending oil into the polymerization solution before the polymerization solvent is separated from the polymerization solution.

Examples of extending oil that is used when the conjugated diene rubber is collected as oil extended rubber include: petroleum-based softeners such as a paraffinic softener, an aromatic softener, and a naphthenic softener; plant-derived softeners; fatty acids; and the like. When a petroleum-based softener is used, it is preferable that the content of polycyclic aromatic extracted by the method IP346 (inspection method of Britain's THE INSTITUTE PETROLEUM) be less than 3%. When extending oil is used, the amount of extending oil that is used is for example 5 to 100 parts by weight, preferably 10 to 60 parts by weight, more preferably 20 to 50 parts by weight, with respect to 100 parts by weight of the conjugated diene rubber.

The conjugated diene rubber obtained by the production method of the present invention contains preferably 5 to 40% by weight, more preferably 5 to 30% by weight, especially preferably 10 to 20% by weight, of a structure formed by binding of three or more conjugated diene polymer chains produced by bringing a denaturant into reaction with the conjugated diene polymer chain having the active terminal, the denaturant having three or more groups per molecule, the three or more groups being each at least either group selected from among an epoxy group and an alkoxy group. When the proportion of the structure formed by binding of three or more conjugated diene polymer chains falls within this range, coagulability and dryability during production are satisfactory; furthermore, when combined with silica, the conjugated diene rubber can give a rubber composition that is far superior in processability and a tire that is superior in low-heat-generating properties. It should be noted that the proportion (fraction by weight) of the structure formed by binding of three or more conjugated diene polymer chains with respect to the total amount of conjugated diene rubber finally obtained is represented as a coupling rate of three or more branches of a conjugated diene polymer chain. This can be measured by gel permeation chromatography (in terms of polystyrene). From a chart obtained by gel permeation chromatography measurement, the coupling rate of three or more branches of a conjugated diene polymer chain is a ratio of the area of a peak portion having a peak top molecular weight 2.8 times greater than a peak top molecular weight indicated by a peak that is smallest in molecular weight to the whole elution area.

The conjugated diene rubber obtained by the production method of the present invention has a weight-average molecular weight of preferably 100,000 to 3,000,000, more preferably 150,000 to 2,000,000, especially preferably 200,000 to 1,500,000 as a value measured by gel permeation chromatography in terms of polystyrene. When the weight-average molecular weight of the conjugated diene rubber falls within this range, it becomes easy to combine silica with the conjugated diene rubber, so that the rubber composition is superior in processability and the resulting tire is superior in low-heat-generating properties.

A molecular weight distribution represented by the ratio of the weight-average molecular weight (Mw) of the conjugated diene rubber obtained by the production method of the present invention to the number average molecular weight (Mn) is preferably 1.1 to 3.0, more preferably 1.2 to 2.5, especially preferably 1.2 to 2.2. When the value of the molecular weight distribution (Mw/Mn) of the conjugated diene rubber falls within this range, the resulting tire is superior in low-heat-generating properties.

The conjugated diene rubber obtained by the production method of the present invention has a Mooney viscosity ($ML_{1+4}$, 100° C.) of preferably 20 to 100, more preferably 30 to 90, especially preferably 35 to 80. It should be noted that when the conjugated diene rubber is oil extended rubber, it is preferable that the Mooney viscosity of the oil extended rubber fall within this range.

In this way, the conjugated diene rubber obtained by the production method of the present invention can be suitably used for various purposes after the addition of compounding ingredients such as a filler and a cross-linker. In particular, combining silica as a filler gives a rubber composition that is suitably used for obtaining a tire that is superior in low-heat-generating properties, wet-grip properties, and strength.

<Rubber Composition>

A rubber composition of the present invention includes: a rubber component containing a conjugated diene rubber obtained by a production method of the present invention; and silica, the rubber composition containing 10 to 200 parts by weight of the silica with respect to 100 parts by weight of the rubber component.

The rubber composition of the present invention may contain another rubber other than the conjugated diene rubber obtained by the production method of the present invention. Examples of the rubber other than the conjugated diene rubber obtained by the production method of the present invention include, but are not particularly limited to, natural rubber, polyisoprene rubber, emulsion-polymerized styrene-butadiene copolymer rubber, solution-polymerized styrene-butadiene copolymer rubber, polybutadiene rubber (which may be either high-cis-BR or low-cis-BR, and may alternatively be polybutadiene rubber containing crystal fibers composed of a 1,2-polybutadiene polymer), styrene-isoprene copolymer rubber, butadiene-isoprene copolymer rubber, styrene-isoprene-butadiene copolymer rubber, acrylonitrile-butadiene copolymer rubber, acrylonitrile-styrene-butadiene copolymer rubber, and the like. Among them, natural rubber, polyisoprene rubber, polybutadiene rubber, and solution-polymerized styrene-butadiene copolymer rubber are preferable. One of these types of rubber may be used alone, or two or more of them may be used in combination.

In the rubber composition of the present invention, the conjugated diene rubber obtained by the production method of the present invention occupies preferably 10 to 100% by weight, more preferably 20 to 100% by weight, especially preferably 50 to 100% by weight out of the rubber component. Causing the conjugated diene rubber obtained by the production method of the present invention to be contained in such a proportion in the rubber component can give a rubber composition that is suitably used for obtaining a tire that is superior in low-heat-generating properties, wet-grip properties, and strength.

The rubber composition of the present invention contains 10 to 200 parts by weight, preferably 20 to 150 parts by weight, more preferably 30 to 120 parts by weight, of silica with respect to 100 parts by weight of the rubber component. When silica is contained in a proportion falling within this range, a tire made from the rubber composition of the present invention is especially satisfactory in low-heat-generating properties. Examples of silica include, but are not particularly limited to, dry white carbon, wet white carbon, colloidal silica, precipitated silica, and the like. Among them, wet white carbon, which is composed mainly of hydrous silicon, is preferable. Alternatively, a carbon-silica dual-phase filler, which includes carbon black and silica carried on a surface of the carbon black, may be used. One of these types of silica may be used alone, or two or more of them may be used in combination.

The silica used has a nitrogen adsorption specific surface area (as measured by the BET method according to ASTM D3037-81) of preferably 50 to 300 m$^2$/g, more preferably 80 to 220 m$^2$/g, especially preferably 100 to 170 m$^2$/g. When the nitrogen adsorption specific surface area of the silica falls within this range, the resulting rubber composition can give a tire that is far superior in low-heat-generating properties. Further, the silica has a pH of preferably less than 7, more preferably 5 to 6.9.

From a point of view of further improving the low-heat-generating properties of a tire, it is preferable that the rubber composition of the present invention further contain a silane coupling agent. Examples of the silane coupling agent include vinyl triethoxysilane, β-(3,4-epoxycyclohexyl)ethyl trimethoxysilane, N-(β-aminoethyl)-γ-aminopropyl trimethoxysilane, 3-octathio-1-propyl-triethoxysilane, bis(3-triethoxysilyl)propyl)disulfide, bis(3-triethoxysilyl)propyl)tetrasulfide, γ-trimethoxysilyl propyl dimethyl thiocarbamyl tetrasulfide, γ-trimethoxysilyl propyl benzothioazyl tetrasulfide, and the like. Among them, from a point of view of avoiding scorching during kneading, it is preferable that the number of sulfur atoms that are contained in a molecule be four or less. One of these silane coupling agents may be used alone, or two or more of them may be used in combination. The amount of a silane coupling agent that is contained is preferably 0.1 to 30 parts by weight, more preferably 1 to 15 parts by weight, with respect to 100 parts by weight of silica.

The rubber composition of the present invention may further contain carbon black such as furnace black, acetylene black, thermal black, channel black, and graphite. When carbon black is used, it is preferable to use furnace black, specific examples of which include SAF, ISAF, ISAF-HS, ISAF-LS, IISAF-HS, HAF, HAF-HS, HAF-LS, T-HS, T-NS, MAF, N234, FEF, and the like. One of these types of carbon black may be used alone, or two or more of them may be used in combination. The amount of carbon black that is contained is preferably 120 parts by weight or less with respect to 100 parts by weight of the rubber component, and the total amount of silica and carbon black is preferably 25 to 120 parts by weight, more preferably 30 to 100 parts by weight, especially preferably 35 to 90 parts by weight, with respect to 100 parts by weight of the rubber component.

The carbon black has a nitrogen adsorption specific surface area (N$_2$SA) of preferably 5 to 200 m$^2$/g, more preferably 20 to 150 m$^2$/g, especially preferably 40 to 130 m$^2$/g, and has an amount of dibutyl phthalate adsorption of preferably 5 to 200 ml/100 g, more preferably 50 to 160 ml/100 g, especially preferably 70 to 130 ml/100 g. When the nitrogen adsorption specific surface area of the carbon black falls within this range, the resulting carbon composition gives a tire that is superior in low-heat-generating properties, and is satisfactory in moldability.

The fillers such as silica and carbon black can be added to the rubber composition by any method, e.g. by employing a method for adding a filler to solid rubber and kneading the mixture (dry kneading method) or a method for adding a filler to a solution of rubber and coagulating and drying the mixture (wet kneading method).

It is preferable that the rubber composition of the present invention further contain a cross-linker. Examples of the cross-linker include, but are not particularly limited to, sulfur, halogenated sulfur, organic peroxides, quinonedioximes, organic polyvalent amine compounds, and alkylphenolic resin having a methylol group, and the like. Among them, sulfur is preferably used. The amount of a cross-linker that is contained is preferably 0.1 to 15 parts by weight, more preferably 0.5 to 5 parts by weight, especially preferably 1 to 4 parts by weight, with respect to 100 parts by weight of the rubber component. When the amount of a cross-linker that is contained falls within this range, the cross-linking is sufficiently performed, so that the resulting rubber cross-linked product is superior in mechanical properties.

When sulfur or a sulfur-containing compound is used as the cross-linker, it is preferable that a cross-linking promoter and a cross-linking activator. Examples of the cross-linking promoter include a sulfenic amide compound, a guanidine compound, a thiourea compound, a thiazole compound, a thiuram compound, a dithiocarbamate compound, a xanthate compound, and the like. Among them, a sulfenic amide cross-linking promoter is preferable. Examples of the cross-linking activator include zinc oxide, higher fatty acid such as stearic acid, and the like. One of these cross-linking promoters and cross-linking activators may be used alone, or two or more of them may be used in combination.

The amount of a cross-linking promoter and a cross-linking activator that are contained is preferably 0.05 to 15 parts by weight, more preferably 0.5 to 10 parts by weight, especially preferably 1 to 5 parts by weight, with respect to 100 parts by weight of the rubber composition. When the amount of a cross-linking promoter and a cross-linking activator that are contained falls within this range, the cross-linking is sufficiently performed, so that the resulting rubber cross-linked product is superior in mechanical properties.

In the rubber composition of the present invention, compounding ingredients that are normally used in the field of rubber processing, such as an antioxidant, an anti-scorching agent, an activator, process oil, a plasticizer, a lubricant, a filler (excluding the aforementioned silica and carbon black), a tackifier, can be contained as appropriate in addition to the aforementioned components according to the purposes for which they are contained.

In order to obtain the rubber composition of the present invention, it is only necessary to knead a mixture of components in the usual manner. For example, it is possible to obtain the intended rubber composition by mixing cross-linker and a cross-linking promoter into a mixture obtained by kneading a mixture of a rubber component and compounding ingredients excluding the cross-linker and the cross-linking promoter. The mixture of the rubber component and the compounding ingredients excluding the cross-linker and the cross-linking promoter is kneaded at a kneading temperature of preferably 80 to 200° C., more preferably 100 to 180° C., and for a kneading time of preferably 30 seconds to 30 minutes. The mixture and the cross-linker and the cross-linking promoter are mixed after cooling to for example 100° C. or lower, preferably 80° C. or lower.

The rubber composition of the present invention can be cross-lined to be used as a tire, and can also be used as resin-reinforcing rubber such as impact-resistant polystyrene.

[Rubber Cross-Linked Product]

A rubber cross-linked product of the present invention is one formed by cross-linking a rubber composition of the present invention. A method for cross-linking and molding in making a rubber product (rubber cross-linked product) such as a tire from a rubber composition of the present invention is not particularly limited, and may be selected according to the shape, size, etc. of the cross-linked product. Molding and cross-linking may be performed simultaneously by filling a mold with a rubber composition containing a cross-linker and by heating it, or a pre-molded rubber composition containing a cross-linker may be cross-linked by being heated. The molding temperature ranges preferably from 20 to 140° C., more preferably 40 to 130° C. The cross-linking temperature ranges preferably from 120 to 200° C., more preferably 140 to 180° C. The cross-linking time ranges for example from 1 to 120 minutes.

The cross-linked product of the present invention can be used in rubber products such as tires, hoses, window frames, belts, shoe soles, antivibration rubber, automobile components, and seismic isolation rubber. Among them, the cross-linked product of the present invention can be suitably used for tires, as it is particularly superior in low-heat-generating properties, wet-grip properties, and strength. The cross-linked product of the present invention is applicable to each part of a tire such as a tread, a carcass, a side wall, and a bead in various types of tires such as an all-season tire, a high-performance tire, and a studless tire, and since it is particularly superior in low-heat-generating properties, it can be particularly suitably used for a tread of a fuel-efficient tire.

SUMMARY

As described above, the present invention provides a method for producing a conjugated diene rubber, including the steps of: (a) forming a polymer block (A) by polymerizing a monomeric mixture with a polymerization initiator in an inert solvent, the polymer block (A) having an active terminal and containing 80 to 95% by weight of an isoprene monomeric unit and 5 to 20% by weight of an aromatic vinyl monomeric unit, the monomeric mixture containing isoprene and an aromatic vinyl monomer; (b) obtaining a conjugated diene polymer chain having an active terminal and having the polymer block (A) and a polymer block (B), the polymer block (B) being formed continuously with the polymer block (A) through the continuation of a polymerization reaction caused by mixing of the polymer block (A) having the active terminal and either 1,3-butadiene or a monomeric mixture containing 1,3-butadiene and an aromatic vinyl monomer, the polymer block (B) having an active terminal and containing 50 to 100% by weight of a 1,3-butadiene monomeric unit and 0 to 50% by weight of an aromatic vinyl monomeric unit; and (c) bringing a denaturant into reaction with the active terminal of the conjugated diene polymer chain having the active terminal, the denaturant having three or more groups per molecule, the three or more groups being each at least either group selected from among an epoxy group and an alkoxy group, the reaction taking place insofar as the total molar ratio of an epoxy group(s) and/or an alkoxy group(s) in the denaturant with respect to the polymerization initiator used in the polymerization ranges from 0.1 to 1.

In the production method of the present invention, it is preferable that the polymer block (A) have a weight-average molecular weight of 500 to 15,000.

In the production method of the present invention, it is preferable that the denaturant is a polyorganosiloxane represented by general formula (I):

[Chem. 3]

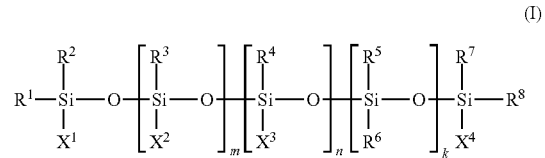

(I)

wherein $R^1$ to $R^8$ are each a C1-6 alkyl group or a C6-12 aryl group and may be identical to or different from one another; $X^1$ and $X^4$ are each any group selected from the group consisting of a C1-6 alkyl group, a C6-12 aryl group, a C1-5 alkoxy group, and a C4-12 group containing an epoxy group and may be identical to or different from one another; $X^2$ is a C1-5 alkoxy group or a C4-12 group containing an epoxy group, and a plurality of occurrences of $X^2$ may be identical to or different from one another; $X^3$ is a group containing 2 to 20 alkyleneglycol repeating units, and when there are a plurality of occurrences of $X^3$, they may be identical to or different from one another; m is an integer of 3 to 200; n is an integer of 0 to 200; and k is an integer of 0 to 200.

Furthermore, the present invention provides a conjugated diene rubber obtained by the production method.

Furthermore, the present invention provides a rubber composition including: a rubber component containing the conjugated diene rubber; and silica, the rubber composition containing 10 to 200 parts by weight of the silica with respect to 100 parts by weight of the rubber component.

The rubber composition of the present invention preferably further include a cross-linker.

Furthermore, the present invention provides a rubber cross-linked product formed by cross-linking the rubber composition.

Furthermore, the present invention provides a tire made from the rubber cross-linked product.

EXAMPLES

In the following, the present invention is described in more detail by way of Examples and Comparative Examples. However, the present invention is not limited to the Examples below. Unless otherwise noted, the term "parts" and the sign "%" in each of the Examples are by weight.

The physical properties of the Examples and the Comparative Examples were measured according to the methods described below.

(Weight-Average Molecular Weight, Molecular Weight Distribution, and Coupling Rate)

The weight-average molecular weight, the molecular weight distribution, and the coupling rate were found on the basis of a chart obtained by gel permeation chromatography on the basis of a molecular weight in terms of polystyrene. It should be noted that specific measurement conditions for gel permeation chromatography are as follows:

Measuring instrument: HLC-8020 (manufactured by Tosoh Corporation)

Column: GMH-HR-H (manufactured by Tosoh Corporation); Two of these were serially connected.

Detector: Differential refractometer RI-8200 (manufactured by Tosoh Corporation)

Eluant: Tetrahydrofuran

Column temperature: 40° C.

As for the coupling rate, the coupling rate of three or more branches of a conjugated diene polymer chain is a ratio of the area of a peak portion having a peak top molecular weight 2.8 times greater than a peak top molecular weight indicated by a peak that is smallest in molecular weight to the whole elution area.

(Aromatic Vinyl Monomeric Unit Content and Vinyl Bond Content)

The aromatic vinyl monomeric unit content and the vinyl bond content were measured by $^1$H-NMR.

(Mooney Viscosity ($ML_{1+4}$, 100° C.))

The Mooney viscosity was measured using a Mooney viscometer (manufactured by Shimadzu Corporation) according to JIS K6300.

(Tensile Strength)

As tensile strength, breaking strength was measured by tensile testing with a dumbbell-shaped No. 3 test piece according to JIS K6251. This property was indicated by an index with the after-mentioned Comparative Example 3 as a reference sample and the measured value of Comparative Example 3 being 100. The greater this index is, the superior the rubber cross-lined product is in tensile strength.

(Wet-Grip Properties)

As wet-grip properties, the impact resilience of a test piece 29.0 mm in diameter and 12.5 mm in thickness at 0° C. was measured by impact resilience testing with the test piece. This property was indicated by an index with the after-mentioned Comparative Example 3 as a reference sample and the measured value of Comparative Example 3 being 100. The greater this index is, the superior the rubber cross-lined product is in wet-grip properties when used as a tire.

(Low-Heat-Generating Properties)

As low-heat-generating properties, tan δ of a test piece 50 mm in length, 12.7 mm in width, and 2 mm in thickness at 60° C. was measured at 10 Hz with a dynamic distortion 2.5% using an ARES manufactured by Rheometric Scientific, Inc. This property was indicated by an index with the after-mentioned Comparative Example 3 as a reference sample and the measured value of Comparative Example 3 being 100. The smaller this index is, the superior the rubber cross-lined product is in low-heat-generating properties when used as a tire.

Example 1: Preparation of a Conjugated Diene Rubber I

Into a nitrogen-substituted 100 ml ampule, 35 g of cyclohexane and 0.43 mmol of tetramethylethylenediamine were added, and 4.3 mmol of n-butyl lithium were further added. Then, 22.0 g of isoprene and 1.7 g of styrene were slowly added and were allowed to react in the ampule at 50° C. for 120 minutes to give a polymer block (A) having an active terminal. The weight-average molecular weight, molecular weight distribution, aromatic vinyl monomeric unit content, isoprene monomeric unit content, and vinyl bond content of the polymer block (A) were measured. Results of these measurements are shown in Table 1.

Next, polymerization was started at 40° C. by adding the whole quantity of polymer block (A) having an active terminal thus obtained into a stirrer-equipped autoclave into which 4000 g of cyclohexane, 6.5 mmol of tetramethylethylenediamine, 306.6 g of 1,3-butadiene, and 113.4 g of styrene had been fed in an atmosphere of nitrogen. Ten minutes after the start of the polymerization, 167.4 g of 1,3-butadiene, and 12.6 g of styrene were continuously added over a period of 60 minutes. The highest temperature during the polymerization was 60° C. After completion of the continuous addition, the polymerization reaction was further continued for 20 minutes. After the degree of polymerization conversion had been confirmed to be in the range of 95% to 100%, polyorganosiloxane A represented by formula (IV) below was added in the form of a 20 wt % concentration xylene solution so that the epoxy group content was 1.42 mmol (which is equivalent to 0.33 times as many moles as n-butyl lithium used), and was allowed to react for 30 minutes. After that, an amount of methanol that is equivalent to twice as many moles as n-butyl lithium used was added as a polymerization terminator to give a solution containing a conjugated diene rubber I. To this solution, 0.15 parts of IRGANOX 1520L (manufactured by Ciba Specialty Chemicals Corporation) was added as an antioxidant to 100 parts of the conjugated diene rubber I. After that, the solvent was removed by steam stripping, and vacuum drying was performed at 60° C. for 24 hours to give the conjugated diene rubber I in a solid form.

[Chem. 4]

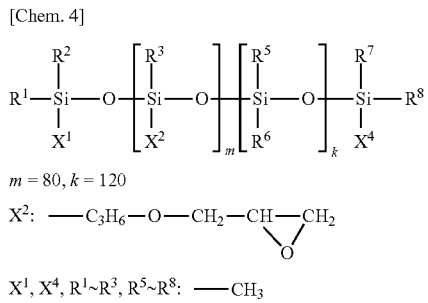

$m = 80, k = 120$ $X^2$: —$C_3H_6$—O—$CH_2$—CH—$CH_2$
                               \ /
                                O $X^1, X^4, R^1$~$R^3, R^5$~$R^8$: —$CH_3$

The weight-average molecular weight, molecular weight distribution, coupling rate, aromatic vinyl monomeric unit content, vinyl bond content, and Mooney viscosity ($ML_{1+4}$, 100° C.) of this rubber were measured. Results of these measurements are shown in Table 1.

TABLE 1

|  | Examples | | | | Comparative Examples | |
| --- | --- | --- | --- | --- | --- | --- |
|  | 1 | 1 | 3 | 4 | 1 | 1 |
| Polymer block (A) having active terminal *1 *3 | SI-Li | SI-Li | SI-Li | SI-Li | IP-Li | SI-Li |
| Structure of conjugated diene polymer chain *2 | SI-SB | SI-SB | SI-SB | SI-SB | IP-SB | SI-SB |
| Weight-average molecular weight of polymer block (A) *3 | 8,400 | 8,900 | 4,600 | 9,600 | 7,600 | 9,500 |
| Molecular weight distribution (Mw/Mn) of polymer block (A) *3 | 1.04 | 1.11 | 1.15 | 1.10 | 1.06 | 1.07 |
| Aromatic vinyl monomeric unit content (wt %) of polymer block (A) *3 | 7.2 | 8.0 | 10.9 | 12.5 | 0 | 22.8 |
| Isoprene monomeric unit content (wt %) of polymer block (A) *3 | 92.8 | 92.0 | 89.1 | 87.5 | 100 | 77.2 |
| Vinyl bond content (wt %) of polymer block (A) *3 | 8.0 | 75.9 | 74.9 | 68.6 | 76.5 | 70.7 |
| Denaturant | Polyorgano-siloxane A | Polyorgano-siloxane A | Polyorgano-siloxane A | Polyorgano-siloxane A | Polyorgano-siloxane A | Polyorgano-siloxane A |
| Results of measurement of conjugated diene rubber |  |  |  |  |  |  |
| Weight-average molecular weigh (Mw) | 375,000 | 397,000 | 433,000 | 361,000 | 394,000 | 387,000 |
| Molecular weight distribution (Mw/Mn) | 1.28 | 1.31 | 1.32 | 1.30 | 1.31 | 1.31 |
| Coupling rate of three or more branches (%) | 12.9 | 14.6 | 14.9 | 10.7 | 13.7 | 12.4 |
| Aromatic vinyl monomeric unit content (wt %) | 21.6 | 21.2 | 21.5 | 21.8 | 20.9 | 22.2 |
| Vinyl bond content (wt %) | 53.6 | 57.0 | 56.9 | 55.8 | 57.6 | 57.0 |
| Mooney viscocity ($ML_{1+4}$, 100° C.) | 39 | 48 | 57 | 42 | 47 | 48 |

*1 SI-Li: hydrocarbyl lithium of random block of styrene and isoprene IP-Li: isoprenyl lithium
*2 SI: random block of styrene and isoprene IP: isoprene block SB: random block of styrene and butadiene (Polymerization started from the block on the left)
*3 Polymer block (A) was replaced with polymer block (c) in Comparative Example 1. and with polymer block (d) in Comparative Example 2.

Example 2: Preparation of a Conjugated Diene Rubber II

Into a nitrogen-substituted 100 ml ampule, 35 g of cyclohexane and 6.9 mmol of tetramethylethylenediamine were added, and 4.3 mmol of n-butyl lithium were further added. Then, 22.0 g of isoprene and 1.9 g of styrene were slowly added and were allowed to react in the ampule at 50° C. for 120 minutes to give a polymer block (A) having an active terminal. The weight-average molecular weight, molecular weight distribution, aromatic vinyl monomeric unit content, isoprene monomeric unit content, and vinyl bond content of the polymer block (A) were measured. Results of these measurements are shown in Table 1.

Next, polymerization was started at 40° C. by adding the whole quantity of polymer block (A) having an active terminal thus obtained into a stirrer-equipped autoclave into which 4000 g of cyclohexane, 306.6 g of 1,3-butadiene, and 113.4 g of styrene had been fed in an atmosphere of nitrogen. After that, processes which are similar to those carried out in Example 1 were carried out to give a conjugated Diene rubber II in a solid form.

Example 3: Preparation of a Conjugated Diene Rubber III

Into a nitrogen-substituted 100 ml ampule, 35 g of cyclohexane and 6.9 mmol of tetramethylethylenediamine were added, and 4.3 mmol of n-butyl lithium were further added. Then, 10.7 g of isoprene and 1.2 g of styrene were slowly added and were allowed to react in the ampule at 50° C. for 120 minutes to give a polymer block (A) having an active terminal. The weight-average molecular weight, molecular weight distribution, aromatic vinyl monomeric unit content, isoprene monomeric unit content, and vinyl bond content of the polymer block (A) were measured. Results of these measurements are shown in Table 1.

Next, polymerization was started at 40° C. by adding the whole quantity of polymer block (A) having an active terminal thus obtained into a stirrer-equipped autoclave into which 4000 g of cyclohexane, 306.6 g of 1,3-butadiene, and 113.4 g of styrene had been fed in an atmosphere of nitrogen. After that, processes which are similar to those carried out in Example 1 were carried out, except that polyorganosiloxane A represented by formula (IV) above was added so that the epoxy group content was 2.84 mmol (which is equivalent to 0.66 times as many moles as n-butyl lithium used), to give a conjugated diene rubber III in a solid form.

Example 4: Preparation of a Conjugated Diene Rubber IV

Into a nitrogen-substituted 100 ml ampule, 35 g of cyclohexane and 6.9 mmol of tetramethylethylenediamine were added, and 4.3 mmol of n-butyl lithium were further added. Then, 21.5 g of isoprene and 3.2 g of styrene were slowly added and were allowed to react in the ampule at 50° C. for 120 minutes to give a polymer block (A) having an active terminal. The weight-average molecular weight, molecular weight distribution, aromatic vinyl monomeric unit content, isoprene monomeric unit content, and vinyl bond content of the polymer block (A) were measured. Results of these measurements are shown in Table 1.

Next, polymerization was started at 40° C. by adding the whole quantity of polymer block (A) having an active terminal thus obtained into a stirrer-equipped autoclave into which 4000 g of cyclohexane, 306.6 g of 1,3-butadiene, and 113.4 g of styrene had been fed in an atmosphere of nitrogen. After that, processes which are similar to those carried out in Example 1 were carried out to give a conjugated diene rubber IV in a solid form.

Comparative Example 1: Preparation of a Conjugated Diene Rubber i

Into a nitrogen-substituted 100 ml ampule, 35 g of cyclohexane and 6.9 mmol of tetramethylethylenediamine were added, and 4.3 mmol of n-butyl lithium were further added. Then, 21.5 g of isoprene were slowly added and were allowed to react in the ampule at 50° C. for 120 minutes to give a polymer block (c) having an active terminal. The weight-average molecular weight, molecular weight distribution, isoprene monomeric unit content, and vinyl bond content of the polymer block (c) were measured. Results of these measurements are shown in Table 1.

Next, polymerization was started at 40° C. by adding the whole quantity of polymer block (c) having an active terminal thus obtained into a stirrer-equipped autoclave into which 4000 g of cyclohexane, 306.6 g of 1,3-butadiene, and 113.4 g of styrene had been fed in an atmosphere of nitrogen. After that, processes which are similar to those carried out in Example 1 were carried out to give a conjugated diene rubber i in a solid form.

Comparative Example 2: Preparation of a Conjugated Diene Rubber ii

Into a nitrogen-substituted 100 ml ampule, 35 g of cyclohexane and 6.9 mmol of tetramethylethylenediamine were added, and 4.3 mmol of n-butyl lithium were further added. Then, 19.9 g of isoprene and 5.8 g of styrene were slowly added and were allowed to react in the ampule at 50° C. for 120 minutes to give a polymer block (d) having an active terminal. The weight-average molecular weight, molecular weight distribution, aromatic vinyl monomeric unit content, isoprene monomeric unit content, and vinyl bond content of the polymer block (d) were measured. Results of these measurements are shown in Table 1.

Next, polymerization was started at 40° C. by adding the whole quantity of polymer block (d) having an active terminal thus obtained into a stirrer-equipped autoclave into which 4000 g of cyclohexane, 306.6 g of 1,3-butadiene, and 113.4 g of styrene had been fed in an atmosphere of nitrogen. After that, processes which are similar to those carried out in Example 1 were carried out to give a conjugated diene rubber ii in a solid form.

As with the conjugated diene rubber I, the weight-average molecular weight, molecular weight distribution, coupling rate, aromatic vinyl monomeric unit content, vinyl bond content, and Mooney viscosity ($ML_{1+4}$, 100° C.) of each of the conjugated diene rubbers II, III, IV, i, and ii were measured. Results of these measurements are shown in Table 1.

Example 5: Evaluation of a Rubber Cross-Linked Product Obtained from a Rubber Composition Containing the Conjugated Diene Rubber I With use of a Banbury mixer having a volume of 250 ml, 70 parts of the conjugated diene rubber I obtained in Example 1 and 30 parts of butadiene rubber (marketed as "Nipol BR1220"; manufactured by Zeon Corporation) were masticated. Then, 50 parts of silica (marketed as "Zeosil 1165MP"; manufactured by Rhodia; Having a nitrogen adsorption specific surface area (BET method) of 163 m²/g), 6.0 parts of a silane coupling agent (bis(3-(triethoxysilyl)propyl)tetrasulfide; marketed as "Si69"; manufactured by Degussa), and 25 parts of process oil (marketed as "Fukkol Eramic 30"; manufactured by Nippon Oil Corporation) were added, and the mixture was kneaded for 1.5 minutes with the starting temperature at 110° C. To this mixture, 25 parts of silica (marketed as "Zeosil 1165MP"; manufactured by Rhodia), 2.5 parts of zinc oxide (zinc flower No. 1), 2 parts of stearic acid (marketed as "SA-300"; manufactured by ADEKA Corporation), and 2 parts of an antioxidant (N-phenyl-N'-(1,3-dimethylbutyl)-p-phenylenediamine; marketed as "NOCRAC 6C"; manufactured by Ouchi Shinko Chemical Industrial Co., Ltd.) were added. The mixture was kneaded for 2.5 minutes, and the rubber composition was discharged out of the Banbury mixer. The temperature of the rubber composition at the end of kneading was 150° C. The rubber composition was cooled to room temperature, kneaded for 3 minutes again in the Banbury mixer, and then discharged out of the Banbury mixer. Then, with use of an open roll at 50° C., the rubber composition thus obtained, 1.5 parts of sulfur, and a cross-linking promoter (a mixture of 1.7 parts of N-t-butyl-2-benzothiazole sulfenic amide (marketed as "NOCCELER NS"; manufactured by Ouchi Shinko Chemical Industrial Co., Ltd.) and 2.0 parts of diphenyl guanidine (marketed as "NOCCELER D"; manufactured by Ouchi Shinko Chemical Industrial Co., Ltd.)). After that, a sheet rubber composition was taken out.

Test pieces were prepared by press cross-linking the rubber composition at 160° C. for 20 minutes. Each of the test pieces was evaluated for tensile strength, wet-grip properties, and low-heat-generating properties. The results are shown in Table 2.

TABLE 2

| | Examples | | | | Comparative Examples | |
|---|---|---|---|---|---|---|
| | 5 | 6 | 7 | 8 | 3 | 4 |
| Rubbers used | | | | | | |
| Conjugated diene rubber I | 70 | | | | | |
| Conjugated diene rubber II | | 70 | | | | |
| Conjugated diene rubber III | | | 70 | | | |
| Conjugated diene rubber IV | | | | 70 | | |
| Conjugated diene rubber i | | | | | 70 | |
| Conjugated diene rubber ii | | | | | | 70 |
| Butadiene rubber | 30 | 30 | 30 | 30 | 30 | 30 |
| Results | | | | | | |
| Tensile strength | 101 | 107 | 101 | 100 | 100 | 95 |
| Wet-grip properties | 103 | 101 | 100 | 102 | 100 | 95 |
| Low-heat-generating properties | 92 | 91 | 75 | 94 | 100 | 93 |

Tensite strength, wet-grip properties, and low-heat-generating properties are indices with Comparative Example 3 as 100 (reference).

Examples 6 to 8: Evaluation of a Rubber Cross-Linked Product Obtained from a Rubber Composition Containing the Conjugated Diene Rubber II, III, or IV Rubber compositions were obtained in the same manner as in Example 5, except that the conjugated diene rubber II obtained in Example 2 (Example 6), the conjugated diene rubber III obtained in Example 3 (Example 7), and the conjugated diene rubber IV obtained in Example 4 (Example 8) were used in the same amounts, respectively, instead of the conjugated diene rubber I. Test pieces of these rubber compositions were evaluated. The results are shown in Table 2.

Comparative Examples 3 and 4: Evaluation of a Rubber Cross-Linked Product Obtained from a Rubber Composition Containing the Conjugated Diene Rubber i or ii Rubber compositions were obtained in the same manner as in Example 5, except that the conjugated diene rubber i obtained in Comparative Example 1 (Comparative Example 3) and the conjugated diene rubber ii obtained in Comparative Example 2 (Comparative Example 4) were used in the same amounts, respectively, instead of the conjugated diene rubber I. Test pieces of these rubber compositions were evaluated. The results are shown in Table 2.

From these results, it was found that cross-linked products (equivalent to tires) of the rubber compositions (Examples 5 to 8) of the present invention containing the conjugated diene rubbers of Examples 1 to 4, each of which corresponds to a conjugated diene rubber of the present invention, respectively were superior in low-heat-generating properties to that of the rubber composition (Comparative Example 3) containing the conjugated diene rubber of Comparative Example 1 containing the polymer block (c) composed solely of isoprene.

Furthermore, the cross-linked products (equivalent to tires) of the rubber compositions (Examples 5 to 8) of the present invention containing the conjugated diene rubbers of Examples 1 to 4, which correspond to conjugated diene rubbers of the present invention, were as well or better in tensile strength and wet-grip properties than, and therefore overall superior to, those of the rubber compositions (Comparative Examples 3 and 4) containing the conjugated diene rubber of Comparative Example 1 or the conjugated diene rubber of Comparative Example 2, which, instead of containing the polymer block (A), contains the polymer block (d), whose aromatic vinyl monomeric unit content is higher than 20% by weight.

INDUSTRIAL APPLICABILITY

The present invention is suitably applicable in every industrial field in which rubber, resin, etc. are utilized and is particularly suitably applicable to rubber products such as tires.

The invention claimed is:

1. A method for producing a conjugated diene rubber, comprising the steps of:
   (a) forming a polymer block (A) by polymerizing a monomeric mixture with a polymerization initiator in an inert solvent, the polymer block (A) having an active terminal and containing 80 to 95% by weight of an isoprene monomeric unit and 5 to 20% by weight of an aromatic vinyl monomeric unit, the monomeric mixture containing isoprene and an aromatic vinyl monomer;
   (b) preparing a conjugated diene polymer chain having an active terminal and having the polymer block (A) and a polymer block (B), the polymer block (B) being formed continuously with the polymer block (A) through the continuation of a polymerization reaction caused by mixing of the polymer block (A) having the active terminal and either 1,3-butadiene or a monomeric mixture containing 1,3-butadiene and an aromatic vinyl monomer, the polymer block (B) having an active terminal and containing 50 to 100% by weight of a 1,3-butadiene monomeric unit and 0 to 50% by weight of an aromatic vinyl monomeric unit, and optionally further forming another polymer block after forming the polymer block (B); and
   (c) bringing a denaturant into reaction with the active terminal of the conjugated diene polymer chain having the active terminal, the denaturant having three or more groups per molecule, the three or more groups being each at least either group selected from among an epoxy group and an alkoxy group, the reaction taking place insofar as the total molar ratio of an epoxy group(s) and/or an alkoxy group(s) in the denaturant with respect to the polymerization initiator used in the polymerization ranges from 0.1 to 1.

2. The method as set forth in claim 1, wherein the polymer block (A) has a weight-average molecular weight of 500 to 15,000.

3. The method as set forth in claim 1, wherein the denaturant is a polyorganosiloxane represented by general formula (I):

[Chem. 1]

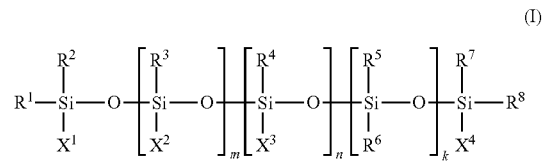

(I)

wherein $R^1$ to $R^8$ are each a C1-6 alkyl group or a C6-12 aryl group and may be identical to or different from one another; $X^1$ and $X^4$ are each any group selected from the group consisting of a C1-6 alkyl group, a C6-12 aryl group, a C1-5 alkoxy group, and a C4-12 group containing an epoxy group and may be identical to or different from one another; $X^2$ is a C1-5 alkoxy group or a C4-12 group containing an epoxy group, and a plurality of occurrences of $X^2$ may be identical to or different from one another; $X^3$ is a group containing 2 to 20 alkyleneglycol repeating units, and when there are a plurality of occurrences of $X^3$, they may be identical to or different from one another; m is an integer of 3 to 200; n is an integer of 0 to 200; and k is an integer of 0 to 200.

4. A conjugated diene rubber obtained by a method as set forth in claim 1.

5. A rubber composition comprising:
   a rubber component containing a conjugated diene rubber as set forth in claim 4; and
   silica,
   the rubber composition containing 10 to 200 parts by weight of the silica with respect to 100 parts by weight of the rubber component.

6. The rubber composition as set forth in claim 5, further comprising a cross-linker.

7. A rubber cross-linked product formed by cross-linking a rubber composition as set forth in claim 6.

8. A tire made from a rubber cross-linked product as set forth in claim 7.

9. The method as set forth in claim 1, wherein the polymer block (A) contains 89 to 95% by weight of the isoprene monomeric unit and 5 to 11% by weight of the aromatic vinyl monomeric unit.

10. The method as set forth in claim 1, wherein the polymer block (B) contains 55 to 90% by weight of the 1,3-butadiene monomeric unit and 10 to 45% by weight of the aromatic vinyl monomeric unit.

11. The method as set forth in claim 1, wherein the ratio by weight based on the total weight of the polymer block(s) (A) and the total weight of the polymer block(s) (B) is 0.001 to 0.1, as (weight of polymer block(s) (A)/weight of polymer block(s) (B)).

12. The method as set forth in claim 11, wherein the ratio is 0.003 to 0.07.

13. The method as set forth in claim 11, wherein the ratio is 0.005 to 0.05.

* * * * *